May 29, 1923.

G. W. BERRY 1,456,862

PRODUCTION OF HINGES AND OTHER LIKE ARTICULATED ARTICLES

Filed Jan. 7, 1921

Inventor
George William Berry.
Attorney

May 29, 1923.

G. W. BERRY 1,456,862

PRODUCTION OF HINGES AND OTHER LIKE ARTICULATED ARTICLES

Filed Jan. 7, 1921

Inventor
George William Berry.
Attorney

May 29, 1923.

G. W. BERRY 1,456,862

PRODUCTION OF HINGES AND OTHER LIKE ARTICULATED ARTICLES

Filed Jan. 7, 1921

Inventor.

George William Berry

Attorney

G. W. BERRY 1,456,862

PRODUCTION OF HINGES AND OTHER LIKE ARTICULATED ARTICLES

Filed Jan. 7, 1921 9 Sheets-Sheet 8

Inventor:
George William Berry
By his Attorney John O. Seifert

May 29, 1923.

G. W. BERRY 1,456,862

PRODUCTION OF HINGES AND OTHER LIKE ARTICULATED ARTICLES

Filed Jan. 7, 1921

Inventor
George William Berry.
Attorney John O. Seifert

Patented May 29, 1923.

1,456,862

UNITED STATES PATENT OFFICE.

GEORGE WILLIAM BERRY, OF WAKEFIELD, ENGLAND, ASSIGNOR TO BERRY HINGE LIMITED, OF LONDON, ENGLAND.

PRODUCTION OF HINGES AND OTHER LIKE ARTICULATED ARTICLES.

Application filed January 7, 1921. Serial No. 435,652.

*To all whom it may concern:*

Be it known that I, GEORGE WILLIAM BERRY, of Wakefield, in the county of York, England, a subject of the King of Great Britain and Ireland, have invented certain new and useful Improvements in the Production of Hinges and Other like Articulated Articles, of which the following is a specification.

This invention relates to the production of hinges and other like articulated articles, and comprises a novel method and apparatus whereby the members of said hinges or articles may be interconnected without the provision of the conventional pintle of wire or the like which is passed through tubular members or knuckles formed integral with said members, the invention including the formation of a pintle or pintles integrally with the material of one of said members and around which a portion or portions of the other member is closed to pivotally or hingedly connect the two hinge members, the entire operation of producing the hinge members and assembling the same being automatic and and involving no manual operations.

In carrying out the invention and taking an example a flat hinge of any suitable character, a pair of plates to constitute the hinge members are provided which may be first formed to appropriate shape and size, or they may be cut from an intermittently fed strip or strips, and in this condition the plates are successively presented by feeding means to the action of a series of sets of dies in the first set of which the plates are in separated condition and portions of one plate cut away to form the plate with projections or extending material while a pintle is partly formed on the other plate by bending the material along one edge. Holes for the passage of attachment means, such as screws, rivets or the like may be formed at the next stage in one or both plates as by punches forming part of or separate from the dies, said holes being formed of somewhat greater diameter than ultimately required.

The plates in this condition are then passed to another set or other sets of dies in which the material of the one plate having the partly formed pintle is cut away or sloted adjacent said partly formed pintle or pintles to provide passages for the forward ends of the projections of the other plate when assembling, and at this stage the plate not previously provided with holes, if such is the case, may be provided with such holes and the holes previously formed in the other plate may be countersunk as by means of punches or stamps forming part of the dies or otherwise, this countersinking operation displacing the metal of the plates and contracting the diameter of the holes to the desired size for the passage of attachment screws, rivets, etc.

At a successive stage, between further dies, one of the plates may have its holes countersunk and the projecting parts of the other plate to form the bulbs or equivalent are bent up to partly form said bulbs.

The two plates so far dealt with are now to be brought into assembled condition, and this is effected preferably by guiding and feeding them in converging directions to a further set of dies in such a manner that the plate having the partly formed bulbs or tubular parts is carried to a higher or different level than the pintle plate, if not already at such level, and at an angle to said pintle plate whereby the partially formed bulbs brought to correct position over or in a different plane to the pintle, or the pintle over the bulbs with the forward edges of said bulbs in register with the cut away parts or slots of the pintle plate so that, on co-operation of the dies, the partially formed bulbs are caused to engage in the slots of the pintle plate and completely closed around the pintle or sufficiently closed to effect the required connection of the plates and thus complete the hinge.

One of the dies by which this final operation is performed may be recessed or of such form that on completion of said operation the two hinge plates are flush or in the same plane.

Any convenient form of discharge device either automatically or manually operated may be provided to deliver the hinges from the apparatus, or such discharge may be effected by the movement of following hinges abutting against those in advance.

The method above described may be modified in various ways, for example by partly forming the pintle or pintles before passing the member through the first set of dies, these latter completing the formation; or the formation or completion of the pintle may be effected at the second stage or in two separate stages in the same machine, the cutting away or slotting operation following such pintle formation in a further stage. It is also contemplated to provide in a single method or machine means by which the hinge members or blanks may be themselves initially formed, as from strips or plates of metal so that a continuous method is provided for production of the hinges or articulated articles directly from the blank material.

An embodiment of apparatus for carrying out the preferred method of the invention is represented in the accompanying drawings, Fig. 1 being a side view of the "sub" press and lower part of a press for carrying out the formation of a flat hinge in five stages, after initial separation of the blanks.

To first refer more particularly to Figures 1, 2, 3 and 6, the material from which the hinges are to be made is fed in two separate strips along a feed table 1 and between a pair of intergeared feed rolls 2 and 3 mounted in a frame 5, the shaft of the lower roll being driven from a gear 6 suitably actuated by means of a lever system 7 and shaft 8 carried by brackets 8ª. The strips of metal are fed for the required distance by said rolls 2 and 3 between severing blades 9 and 10 of the guillotine type, the blade 10 being stationary and carried at the end of the table 1. The other blade 9 is mounted on a crosshead 11 mounted for vertical reciprocation on rods or posts 12. The dies are arranged in opposed and successively alined pairs as indicated at I, II, III, IV and V whereby to operate upon a pair of hinge members simultaneously to perform the respective operations, in the present instance five in number, to form and connect the members, synchronously operating upon five pairs of members, it being understood, of course, that these five operations are successively performed upon a pair of members, the upper dies or punches being carried by the head 11 to have movement therewith while the lower dies are mounted in the bed of the press.

Figures 7, 9:
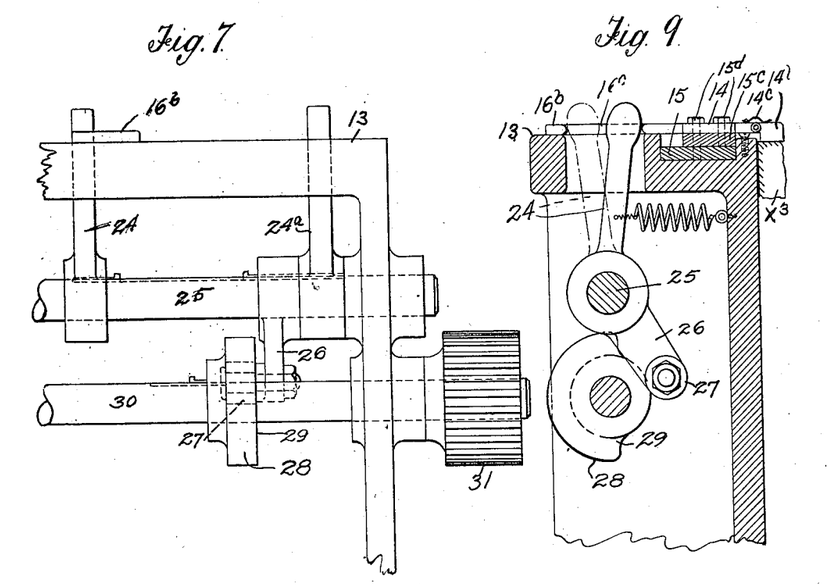
Fig. 7 is a detail side elevation of actuating means for the hinge blank or plate feeding means.
Fig. 9 is an end elevation of the feeding mechanism shown in Figures 7 and 8 with the press bed shown in section.
Figure 8:
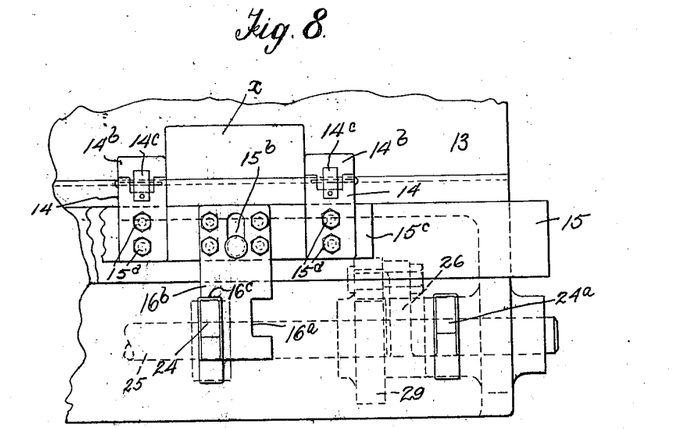
Fig. 8 is a plan view looking at the top of Figure 7.
Figures 10, 11, 12, 13:
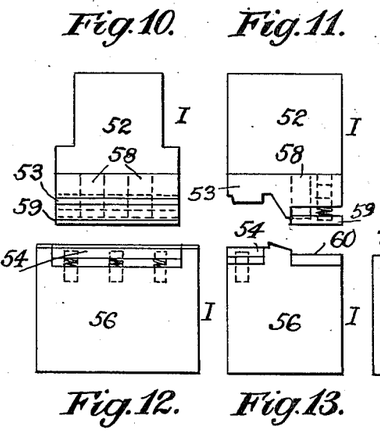
Figs. 10 to 29 inclusive, are front and side elevations of the respective punch and die mechanism to which the blanks or plates are successively presented.

After the plates have been severed from the strips and deposited upon the bed of the press they are successively presented to the punch and die mechanism by feeding means comprising bars 15 slidably mounted in depressions in the framework of the press for longitudinal reciprocable movement, auxiliary bars 15ᶜ being mounted upon the bars 15 in superposed relation to and having a pin and slot connection 15ᵇ with the bars 15 to permit of the auxiliary bars participating in the reciprocable movement of the bars 15 and permitting of independent reciprocable movement of the bars 15ᶜ transversely of the movement of the bars 15 for a purpose to be hereinafter set forth. Plates or arms 14 are fixed to the bars 15ᶜ by bolts 15ᵈ to extend laterally therefrom and pivotally carry at the extended ends feeding fingers 14ᵇ to extend and ride over the lower dies, as indicated at $x^3$ in Figure 9, and yieldingly urged toward the dies by springs 14ᶜ to assure the fingers engaging in back of a hinge plate or blank indicated at $x$ in Figure 8. The bars 15 are connected for synchronous movement by a cross-head 16 adjustably mounted by nuts 17 upon threaded studs 15ᶠ fixed to the ends of the bars 15, movement being imparted to the bars 15 through said crosshead by a lever 19 having a link connection 18 with the crosshead, said lever 19 being mounted upon the shaft 8 and actuated by an arm 21 carrying a roller at the free end co-operating with a cam 22 fixed to a shaft 23 extending transversely of the press. To move the feeding fingers 14ᵇ away from in back of a hinge plate or blank which has been advanced to one of its positions to be operated upon by the dies and permit the fingers to clear such fed blank during the receding movement of the bars 15 and cause the fingers to again engage in the rear of the successive hinge blank to feed the same upon a successive forward movement of the feed bars 15, the feed finger carrying bars 15ᶜ have reciprocable movement imparted thereto transversely of the movement of the feed bars 15 which is permissible by the pin and slot connection 15ᵇ thereof with the bars 15. This movement is imparted to said feed finger carrying bars 15ᶜ by arms 24, 24ᵃ there being two pairs of these arms mounted on each rock shaft 25, 25ᵃ to extend upwardly therefrom and co-operating with arms 16ᵇ bolted to the bars 15ᶜ to extend laterally therefrom oppositely to the finger carrying plates 14. The shafts 25 and 25ᵃ are rocked to actuate the arms 24, 24ᵃ by arms 26 fixed to said shafts carrying rollers 27 at the free ends engaging cam faces 28 on disks 29 fixed to shafts 30, 30ᵃ driven from shaft 23 as by worm gearing 31. To operatively connect the arms 24, 24ᵃ to the arms 16ᵇ to impart the transverse reciprocable movement to the feed finger carrying bars 15ᶜ, and to disconnect said arms from the arms 16ᵇ each of said lateral arms has recessed portions 16ᵃ, 16ᶜ in opposite sides of the extended portion. The cams 29 are so timed and arranged as to position the arms 24, 24ᵃ in alinement with the arm recesses 16ᵃ, 16ᵇ during the movement of the blank feeding bar 15 thereby causing the arms 24 to engage in the recesses 16ᵇ at the termination of the feeding movement when the arm carrying shafts 25, 25ᵃ are rocked moving the feedfinger carrying bars 15ᶜ laterally and the feeding fingers 14ᵇ away from the hinge blanks when return movement is imparted to the feed bar 15 and the arms 24ᵃ are caused to engage in the recesses 16ᵃ when the shafts 25, 25ᵃ are again rocked and the finger carrying bars 15ᶜ moved to position the feeding fingers 14ᵇ in the rear of the successive hinge blanks.

The feeding mechanism moves the hinge blanks or plates to the die positions I, II, III, IV and V in succession over the dies and beneath the punches, the feeding fingers being first given a forward movement by means of the bars 15 and then an inward transverse movement by the bars 15ᶜ to bring the fingers behind the hinge plate for the feeding operation. When the punches at each position have acted on the plates the feed finger carrying bars 15ᶜ are retracted and then the bar 15 is moved rearward and the bar 15ᶜ moved inward to position the feed fingers to act on another pair of plates, the transverse movements of the feed members being effected by means of the arms, 24, 24ᵃ.

At the die position 1 the pintle plates y have one longitudinal edge turned up, as at 50, as a preliminary to forming the pintle, and the bulb or knuckle plate has parts cut away from one edge to form three extensions or projections 51 ultimately destined to form bulbs or knuckles. These operations are effected by the pair of dies shown in Figures 10 to 13 where an upper die 52 is provided with a depending punch 53 which co-operates with a spring influenced plate 54 on the lower die 56 to produce the turned up edge 50 on plate y. The cut away portions to form the projections 57 on plate or blank x are produced by two punches 58 mounted in the upper die 52 which extend through a spring influenced stripper plate 59 and co-operate with the surface 60 of the lower die upon which the plate y rests.

Figures 14, 15, 16, 17:
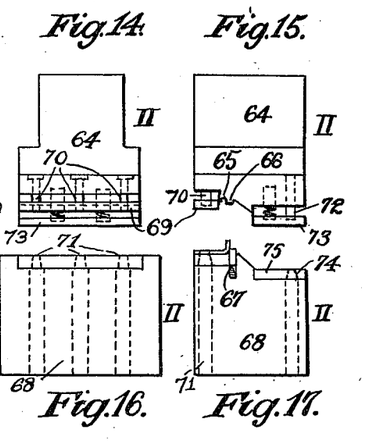
Figure 18:
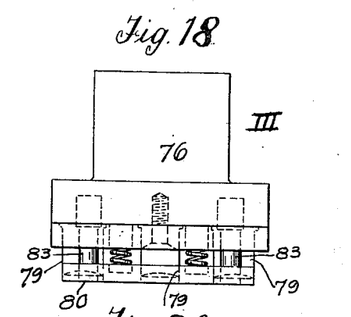
Figure 19:
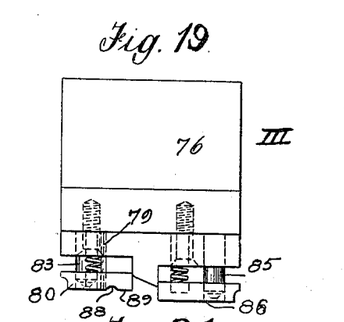
Figure 20:
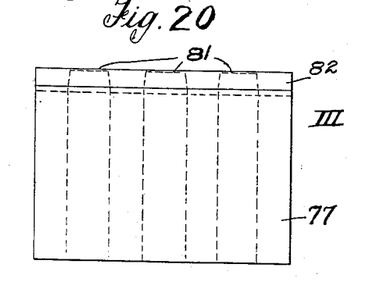
Figure 21:
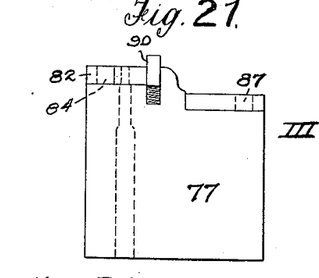
Figures 22, 23, 24, 25, 26, 28:
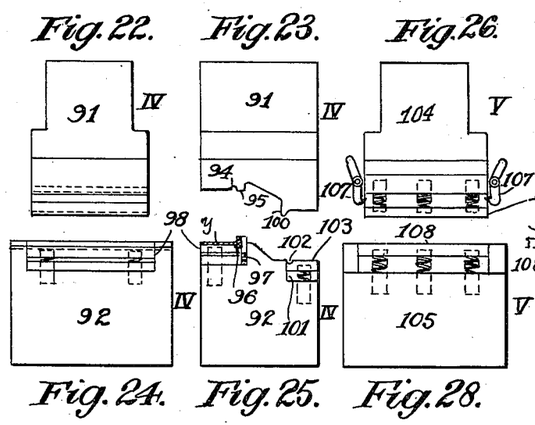
Figure 27:
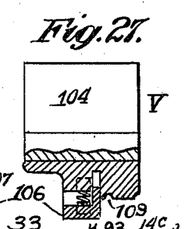

At position II the turned up edge 50 of the pintle plate y is rolled over to a partly formed circle of the pintle, as at 61, and perforations 62, 63 are formed in the respective plates y and x, these operations being performed by a pair of dies shown in Figures 14 and 17 in which an upper die 64 is provided with shaped surfaces 65, 66, the first acting to turn over the edge 61 of plate y and the latter co-operating with a spring influenced plunger 67 in the lower die 68, plate y being held by stripper plate 69 on the upper die member during this operation. The perforations 62 are formed in plate y by three punches 70 in the upper die extending through a stripper plate 69 and entering holes 71 in the lower die. The perforations 63 are formed in the plate x by means of three punches 72 on the upper die extending through a spring influenced stripper plate 73 and entering holes 74 formed in the surface of the lower die on which the plate x rests.

At position III a pair of dies 76, 77 shown in Figures 18 to 21 cause the pintle plate y to be slotted or cut back, as at 78, adjacent the partly turned over pintle 61 by means of three punches 79 on the upper die 76 extending through a stripper plate 80 and co-operating with shallow recesses 81 in the top plate 82 of the lower die 77. At the same time, the perforations 62 in plate y are countersunk by punches 82 on the upper die also extending through the stripper plate 80 and engaging holes 84 in the lower die. The plate x also has its holes 63 countersunk by means of punches 85 extending through a stripper plate 86 and engaging holes 87 in the lower die. The members 88, 89 formed on the upper die and 90 carried by the lower die operate to further partly form the pintle 61.

At the position IV two pair of dies 91, 92, shown in Figures 22 to 25 co-operate to form the pintle 61 to circular form in cross section, as at 93 this being performed by shaped surfaces 94, 95 on the upper die 91 co-operating with a recess 96 and spring pressed plunger 97 on the lower die, the plate y resting on a spring pressed plate 98 during this operation. At the same time the extensions 57 of the plate x are bent at right angles to the body of the plate and curved at the juncture of said projections with the body of the plate, as at 99, this being effected by a projection 100 on the upper die co-operating with a shoulder 101 and recess 102 on a spring pressed plate 103 on the lower die.

Figure 29:
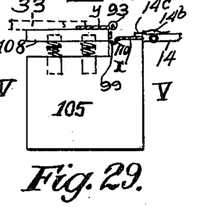
Figures 30, 31, 32:
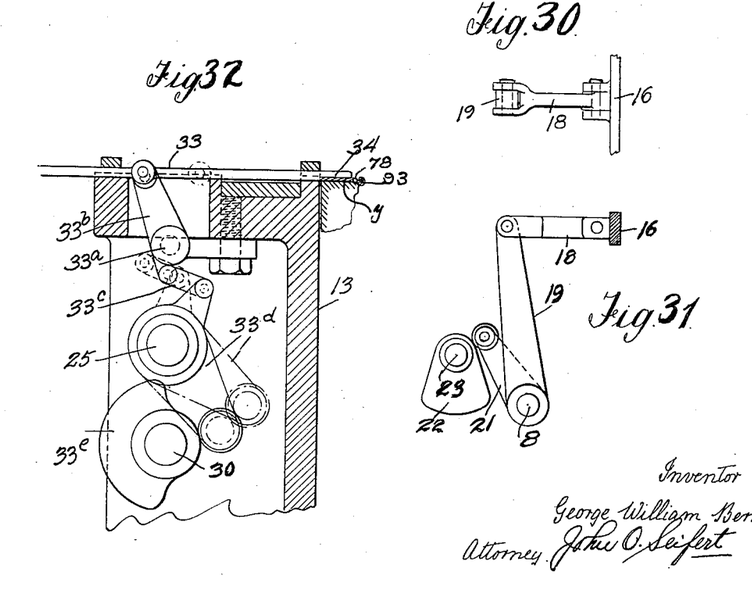
Fig. 30 is a detail view in plan to show the connection of the hinge blank feeding means to its actuating means.
Fig. 31 is a side elevation of the actuating means for the hinge blank feeding means.
Fig. 32 is a detail view of the means for feeding the pintle plate at the final assembling operation.

It now remains to assemble the two plates y and x which is accomplished at position V, for which purpose they are brought beneath a pair of dies 104, 105 shown in Figures 26 to 29, the plate *x* by a feeding finger 14 and the pintle plate *y* by a special form of feeding mechanism which does not have movement in a direction longitudinally of the press as the feeding fingers 14, but has movement transverse of the press to a greater extent than the fingers 14 so that the two plates *x* and *y* are brought to the positions relative to each other shown in Figure 29 in which the plate *y* is supported in a plane above the plate *x* with the formed pintle 93 in a plane with the curved portion formed at the juncture of the extensions or projections 57 with the body of the plate. The plates are supported in a higher plane relative to each other by the arrangement of the bed press 13. This feeding mechanism is shown in Figure 32 and comprises a slide 33 reciprocably mounted in the bed of the press and having an undercut portion 34 at the under surface of the forward end to fit over the hinge plate *y*. This slide is reciprocated by a lever 33$^b$ pivotally supported, as at 33$^a$, one arm of which is pivotally connected to the slide and the other arm having a link connection 33$^c$ with one arm of a bell crank lever 33$^d$ mounted on the shaft 25, the other arm of said lever carrying a roller to co-operate with a cam 33$^e$ on shaft 30. After the hinge plates or members *x* and *y* have been brought into proper relative position, as shown in Figure 29, the plates are then subjected to the action of the dies illustrated in Figures 26 to 29. The upper die 104 is provided with a spring influenced sliding head 106 held from dropping out of the body by the die by gravity latches 107 pivotally mounted on the die adapted to engage notches in the ends of the head 106, this head being adapted to yieldingly engage the hinge plate *y* resting upon a plate 108 yieldingly supported by springs over and above the surface of the die 105. The hinge plate *y* by the descent of the head 104 is brought into the same plane with the plate *x* on die member 105 with the upturned extensions 99 on said latter plate extending through the slots 78 of plate *y* and with the pintle 93 of the latter engaging in the curved portion at the juncture of the projections 57 with the body of the plate. The upper die 104 then acts to completely turn the previously bent extensions 99 of plate *x* over or around the pintle 93 of the other plate by means of a shoulder 109 on the upper die the curved portions of plate *x* at the juncture of the projections therewith resting in a recess 110 in the lower die.

Figure 1:
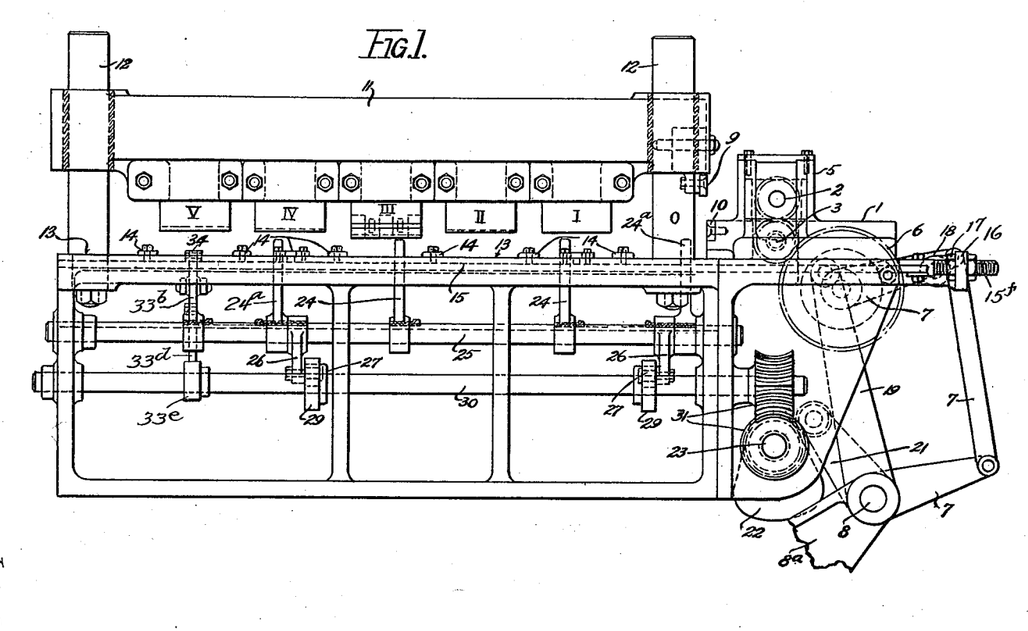
Figure 2:
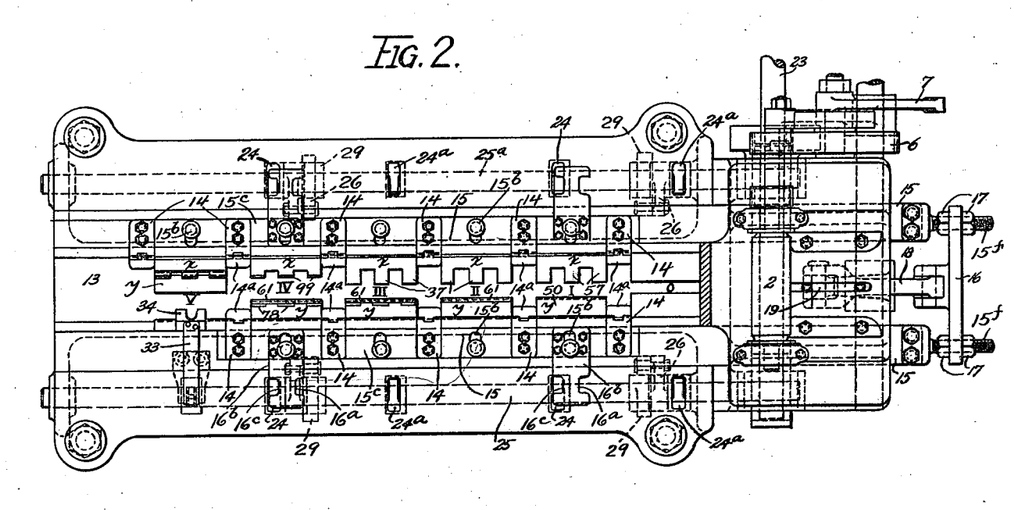
Fig. 2 is a sectional plan view of Fig. 1.
Figure 3:
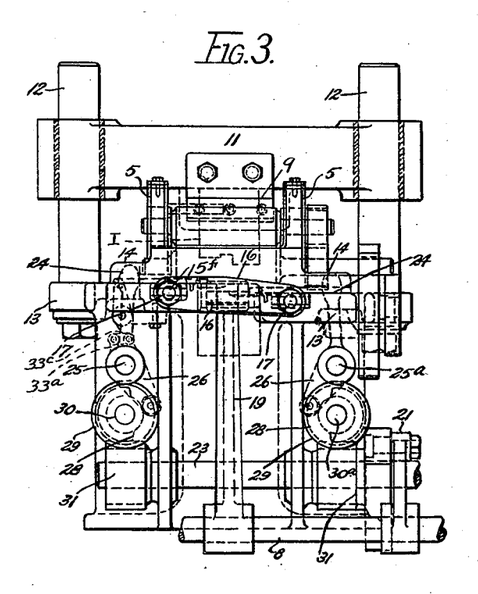
Fig. 3 an end view of said Fig. 1 from the right thereof.
Figure 4:
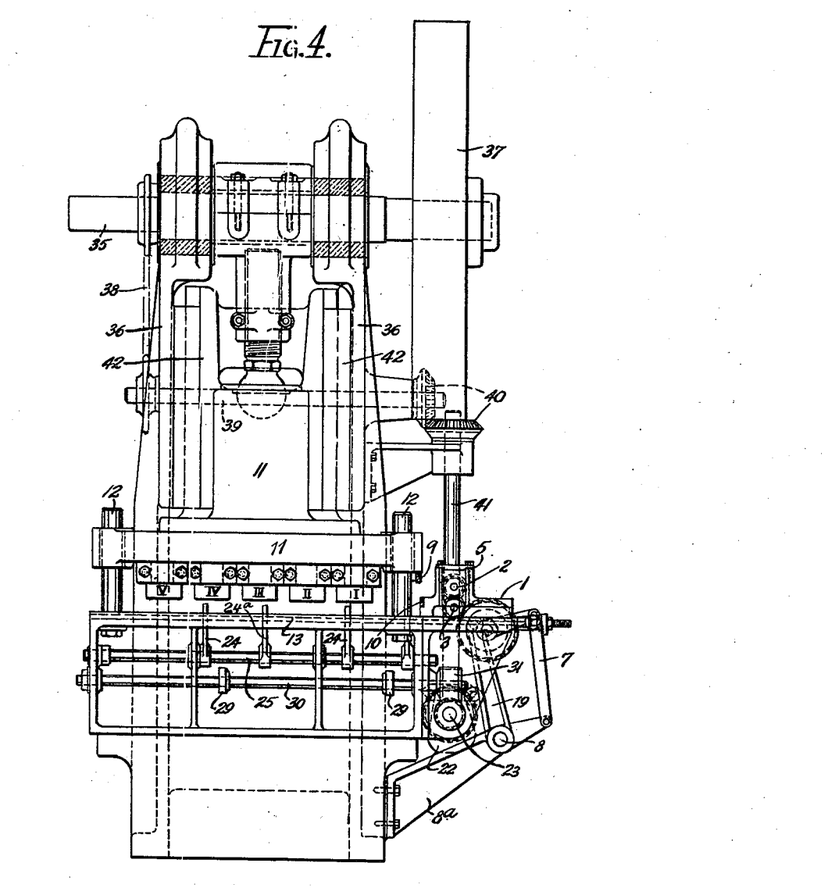
Figs. 4 and 5 are elevations at right angles to one another and on a reduced scale showing in less detail the entire press.
Figure 5:
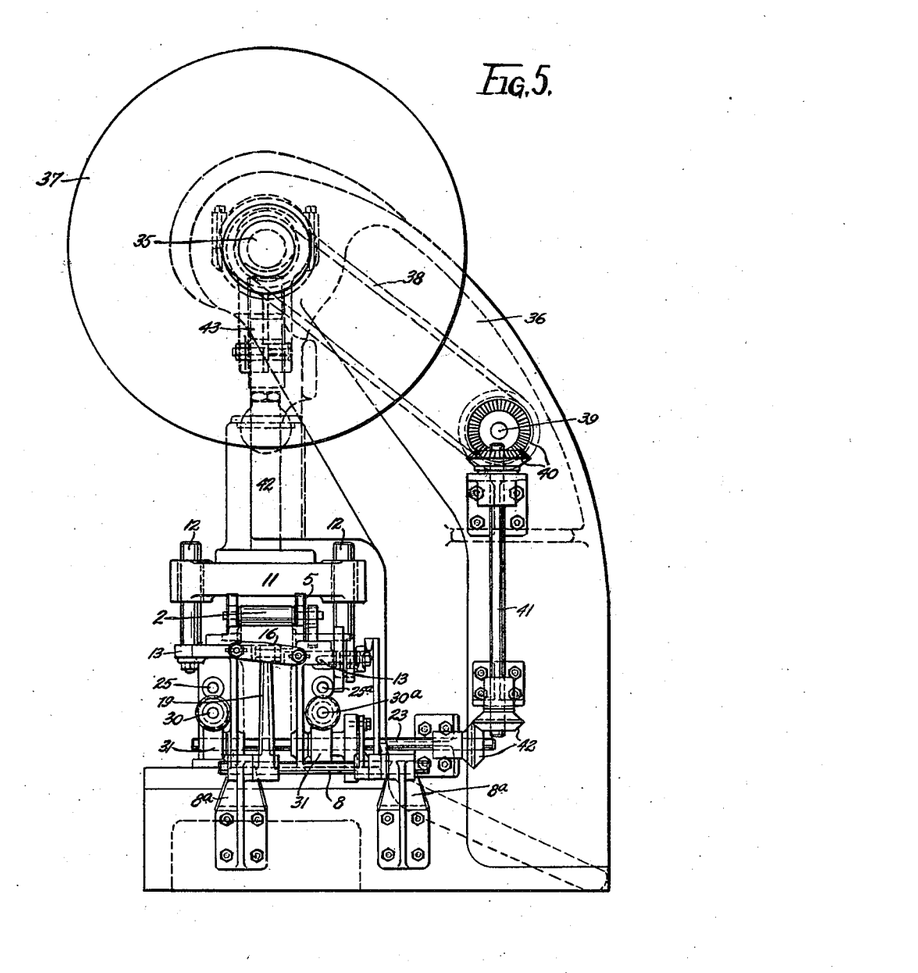
Figure 6:
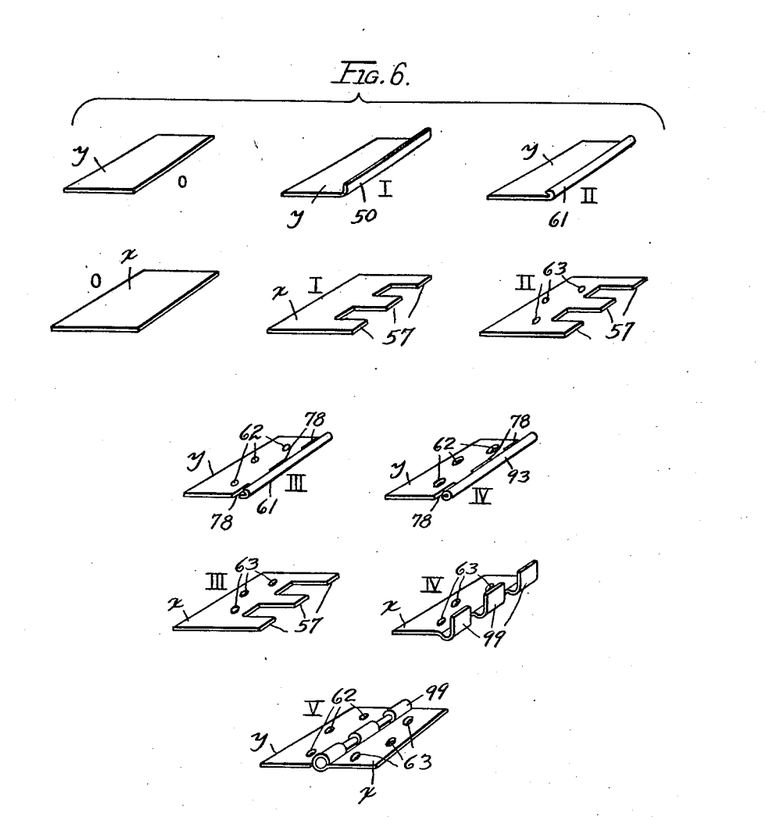
Fig. 6 shows perspective views of the hinge members in the various stages of the complete operation.

The upper part of the press may be of any conventional or appropriate construction. In the present instance as shown in Figures 4 and 5 there is provided a main driving shaft 35 journalled in brackets 36 and driven from a pulley 37. Motion is transmitted from said shaft 35 by a chain transmission 38 through a horizontal shaft 39 which through beveled gearing 40 drives a vertical shaft 41, which in turn through beveled gearing 42 drives the transverse shaft 23 hereinbefore referred to. The crosshead 11 carrying the upper dies and punches is reciprocated toward and away from the lower dies by any appropriate means, for which purpose it is shown is mounted to slide in guideways 42 and is connected by a link 43 to an eccentric support upon the main shaft 35.

What I claim as my invention and desire to secure by Letters Patent of the United States is:—

1. The method of producing hinges and like articulated articles consisting in providing a pair of flat blanks, bending one blank along one edge and slotting said blank in a succession of stages, and simultaneously therewith forming extensions on the other blank destined to provide bulbs and engaging the same in the slots in the rear of the bent portion of the first blank and finally turning such extensions over the bent portion of the first blank to assemble the two blanks.

2. The method of producing hinges and like articulated articles consisting in forming a pintle on one hinge member in a succession of stages, forming extensions on the other hinge member destined to provide bulbs, slotting the pintle member adjacent the pintle for reception of the ends of said extensions, providing each hinge member with holes for fastening purposes, and finally turning the bulb extensions over the pintle to assemble the two members.

3. The method of producing hinges and like articulated articles consisting in feeding hinge members in separated relation between a series of associated dies in succession, forming a pintle on one hinge member in a succession of stages, forming extensions of the other hinge member destined to provide bulbs, slotting the pintle member adjacent the pintle for reception of the ends of said extensions, bringing the two separated members into overlapping relation and finally turning the bulb extensions of one member over the pintle of the other member to hingedly connect the said two members.

4. The method of producing hinges and like articulated articles, consisting in feeding two separated strips of metal, severing same in determined lengths to produce blanks, successively feeding said separated blanks to a series of dies or punches by which a pintle is formed on one blank and bulb extensions on the other, providing the pintle blank with recesses to receive the bulb extensions, moving one blank into overlapping relation with the other and finally closing said extensions over the pintle to complete the hinge.

5. Apparatus for producing hinges and like articulated articles comprising a feed table, feed rolls thereon, severing means acting at the end of said table to produce blanks from material fed by said feed rolls, and a series of feed members adapted for longitudinal and transverse reciprocation adapted to feed severed blanks to a series of associated dies or punches in succession, said die mechanism being operative to form a pintle along the edge of a blank and projections along the edge of another blank and bending said projections around the pintle of the first blank.

6. Apparatus for producing hinges and like articulated articles comprising a feed table, feed rolls thereon, severing means acting at the end of said table to produce blanks from material fed by said feed rolls, and a series of feed members adapted for longitudinal and transverse reciprocation adapted to feed severed blanks to a series of associated dies or punches in succession, the blanks being fed longitudinally through the machine in separate paths.

7. Apparatus for producing hinges and like articulated articles comprising a feed table, feed rolls thereon, severing means acting at the end of said table to produce blanks from material fed by said feed rolls, a series of feed members adapted for longitudinal and transverse reciprocation adapted to feed severed blanks to a series of associated dies or punches in succession, the blanks being fed longitudinally through the machine in separate paths, and a final feed member having a greater stroke than those preceding, and adapted to transfer one completed blank to a position in overlapping relation to the other blank to permit them to be assembled.

8. The method of producing hinges and like articulated articles, consisting in providing a pair of plates to constitute hinge members, bending one of said plates upon itself along one edge to substantially circular shape in cross section and slotting the plate in the rear of said bent portion, cutting out portions of the material along one edge of the other plate to form projections and bending said projections substantially at right angles to the body of the plate, and assembling the plates so formed by inserting the bent projections of the one plate in the slots in the rear of and bending the same around the bent portion of the other plates.

9. The method of producing hinges and like articulated articles, consisting in providing a pair of plates to constitute hinge members, bending one of said plates upon itself along one edge to substantially a right angle to the body of the plate, then bending said bent portion to partially circular shape in cross section, then slotting the plate in the rear of the bent portion, then forming said bent portion to substantially circular shape in cross section, and simultaneously with the forming of the first plate cutting portions from the second plate to provide the same with projections, then bending the said projections to substantially at a right angle to the body of the plate, then inserting said bent projections in the slots of the first plate, and then bending said bent projections around the bent edge of the first plate.

10. The method of producing hinges and like articulated articles, consisting in providing a pair of plates, subjecting the same successively to die mechanism to bend one plate along one edge to substantially a right angle to the body of the plate and cutting portions from the second plate along one edge thereof, then further bending the bent portion of the first plate to partially circular shape in cross section and providing the second plate with perforations for the engagement of attachment means, then slotting the first plate in the rear of the bent portion, and providing the same with perforations for the engagement of attachment means and arranging the perforations in the second plate with countersunk portions by contracting the material at the wall of said perforations, then arranging the perforations in the first plate with countersunk portions by contracting the material at the wall of said perforations and bending the projections of the second plate substantially at a right angle to the body of the plate and curve the projections at the juncture therof with the body of the plate, and then assembling the plates by inserting the bent projections of the second plate in the slots of the first plate and bending said projections around the bent portion of the first plate.

In witness whereof I have signed this specification.

GEORGE WILLIAM BERRY.